United States Patent [19]

Thomas

[11] Patent Number: 4,679,108
[45] Date of Patent: Jul. 7, 1987

[54] PORTABLE PLAYBACK SYSTEM WITH ACTIVE TAPE DRIVE TENSIONING FEATURE

[75] Inventor: Keith E. Thomas, San Fernando, Calif.

[73] Assignee: Capitol Records, Inc., Hollywood, Calif.

[21] Appl. No.: 463,290

[22] Filed: Feb. 2, 1983

[51] Int. Cl.⁴ ............................................. G11B 15/60
[52] U.S. Cl. ................................................. 360/130.31
[58] Field of Search .................... 360/31, 130.31, 96.1, 360/10.3

[56] References Cited

U.S. PATENT DOCUMENTS

| | | | |
|---|---|---|---|
| 3,454,713 | 7/1969 | Yanagimachi et al. | 360/10.3 |
| 3,499,998 | 3/1970 | Tanigawa et al. | 360/130.31 |
| 4,210,942 | 7/1980 | Nakamura et al. | 360/65 |
| 4,258,769 | 3/1981 | Naylov et al. | 360/65 |
| 4,314,288 | 2/1982 | Gyi | 360/65 |
| 4,330,802 | 5/1982 | Karo et al. | 360/130.31 |
| 4,446,493 | 5/1984 | Terui | 360/65 |
| 4,484,242 | 11/1984 | Kimizuka et ai. | 360/130.31 |

Primary Examiner—Vincent P. Canney
Attorney, Agent, or Firm—Lyon & Lyon

[57] ABSTRACT

The present invention generally relates to playback systems for monitoring the performance of cassette tape duplicating recorders and is specifically directed to a performance monitoring playback system including precision equalization circuitry and an active tape tensioning mechanism which together produce stable high frequency system response.

16 Claims, 7 Drawing Figures

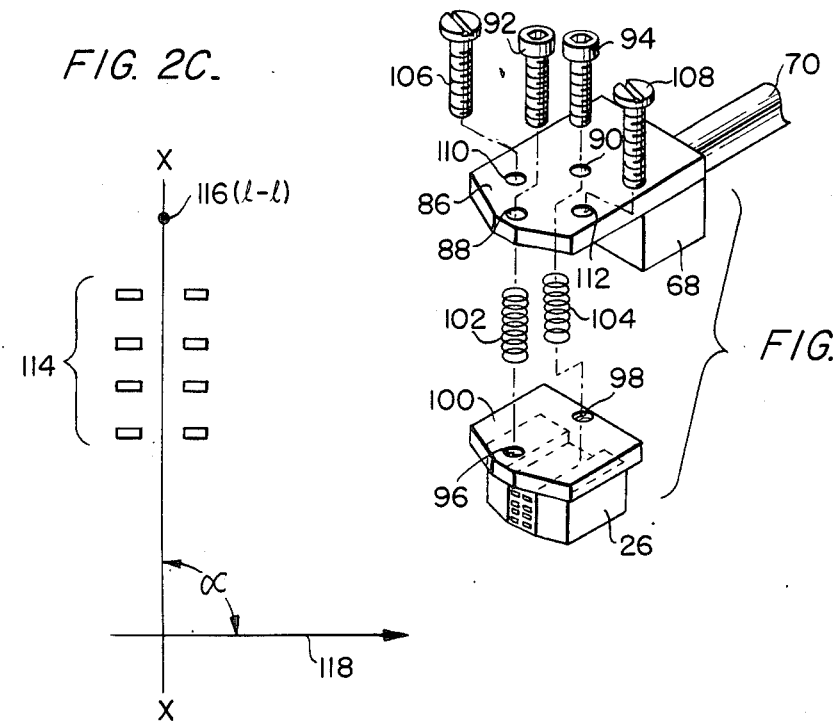
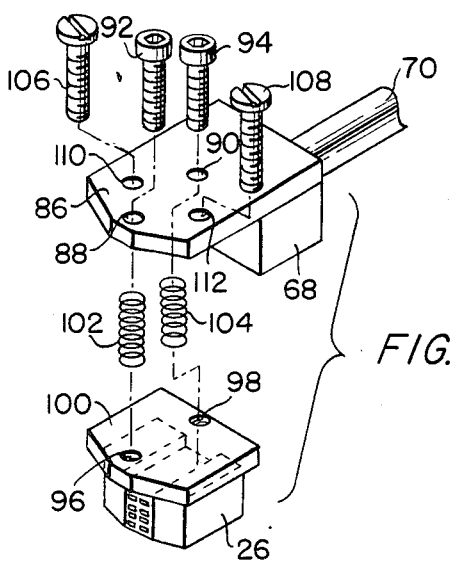
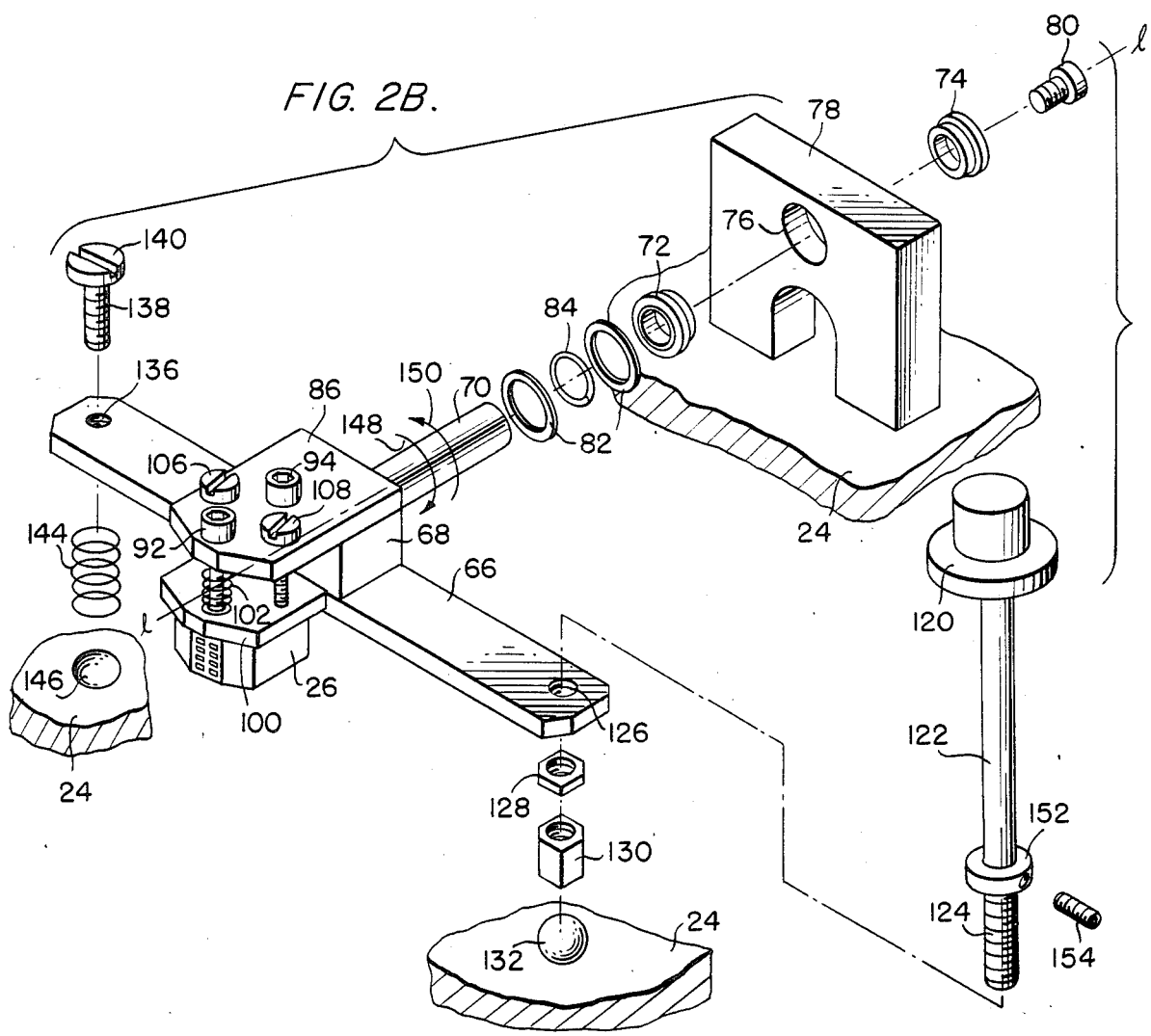

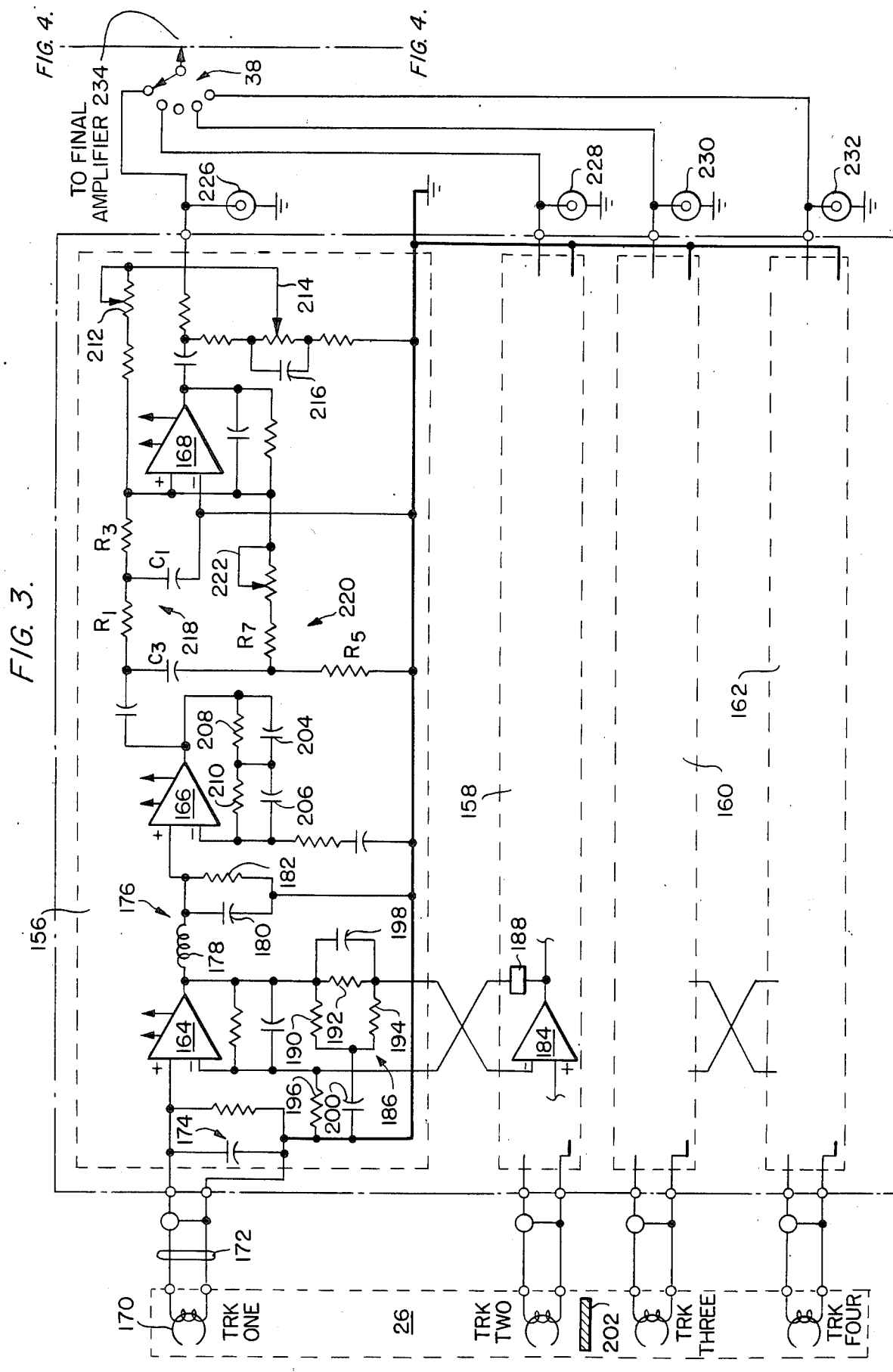

ium adjustment mechanism of FIGS. 2A–B and the head gap centerline on the system playback head;

PORTABLE PLAYBACK SYSTEM WITH ACTIVE TAPE DRIVE TENSIONING FEATURE

BACKGROUND ART

In the recording industry, it is common practice to duplicate cassette tape recordings by supplying one or more "slave" recorders with recording signals from a single master transport on which a master cassette tape is played. The master and slave recorders are operated at high speeds to provide duplication at sixty-four times the normal tape playback speed, i.e., at 64:1 duplication ratios, thus significantly increasing the recording capacity of the master/slave duplicating arrangement. As can be appreciated, some means for monitoring the performance of the slave recorders is highly desirable. Prior art performance monitoring systems frequently utilize a one-track test or playback head which detects the signals being duplicated onto the slave tape. The playback head is placed in the path of the tape leaving the slave recording head to provide immediate playback of the duplicated signals. In this manner, proper quality control measures can be instituted as indicated to correct any inaccuracies found in the duplicated tapes.

Although enhancing quality control during the tape duplication process, prior art performance monitoring systems suffer from several drawbacks which limit overall system effectiveness. Inasmuch as prior art playback heads generally have single track configurations, track selection on the four-track cassette tapes commonly employed in the recording industry can only be achieved by changing the vertical position of the playback head. Changes in vertical head position can in turn create zenith errors in the playback signal obtained from the head. Prior art monitoring systems also make use of the existing tape take-up tension in the slave recorder to establish tape-to-playback head contact. Such existing take-up tension often results in insufficient playback head contact pressure, causing low playback output signals and unstable signal levels at the high signal frequencies associated with high duplication ratios. Adequate playback signal equalization is accordingly difficult to obtain and the playback signals must be checked on a real time playback deck, which latter procedure greatly increases the amount of labor required to carry out the tape duplicating process. Hence, it would be of great benefit to provide a performance monitoring system which eliminates the aforementioned problems and which could be adpated to fit existing slave recorders with minimum alteration of the slave recorder structure.

DISCLOSURE OF THE INVENTION

It is therefore an object of the present invention to provide a performance monitoring system suitable for use with high speed slave recorders.

It is another object of the present invention to provide a performance monitoring playback system which can be fitted into the tape path of existing slave recorders without significantly modifying the slave recorder structure.

It is still another object of the present invention to provide a performance monitoring playback system for slave recorders wherein the playback system supplies tape tension for establishing tape-to-playback head contact independent of the existing take-up tension of the slave recorder.

It is a further object of the present invention to provide a performance monitoring playback system which employs a four-track fixed height playback head connected to a four-channel pre-amp to permit simultaneous playback and individualized channel adjustments on all four tape tracks.

It is an object of the present invention to provide a performance monitoring playback system having a four-track playback head compatible with high-speed, four-channel slave recorders, wherein the playback signals generated by the playback head are processed in pre-amp equalization circuitry which may be adjusted to compensate for the high signal frequencies associated with large duplication ratios.

It is also an object of the present invention to provide a performance monitoring playback system having a highly sensitive azimuth adjustment mechanism for correcting the azimuth of the system playback head.

These and other objects of the present invention are attained in a portable performance monitoring playback system which is supported on a base plate designed to fit on the deck plate of a slave recorder between the existing slave recorder exit pinch roller and inertial guide roller. The system is activated by an optical sensor positioned to detect energization of the PLAY light on the slave recorder, in essence "slaving" the system to the slave recorder. Positive tape tension in the system is supplied using a puck driven by a motor at a speed which otherwise runs the puck faster than the tape. Because the tape cannot slip against the puck surface, however, the actual motor speed will be limited by the tape speed. The motor operating current will subsequently rise until clamped by a current regulator circuit in the system electronics, causing the motor to operate in a torque mode which adds a fixed amount of tension to the tape sufficient to establish tape-to-playback head contact. The playback head itself is a fixed height, four-track output head connected to a four-channel pre-amp stage. The playback head is mounted to the system base plate via an azimuth adjustment mechanism which permits calibrated azimuth control. Precision equalization circuitry in the pre-amp stage exhibits fixed turnover frequency, permitting high frequency correction with no effect on midrange system response. The combination of the active tape tensioning feature and the precision equalization circuitry results in accurate and stable high frequency system response. Additional pre-amp circuitry may be used to adjust the system equalization depending upon whether the system is operating at 64:1 or 32:1 duplication ratios.

BRIEF DESCRIPTION OF THE DRAWINGS

The various objects, features, and advantages of the present invention will become more apparent upon consideration of the following Brief Description of the Drawings and Best Mode for Carrying Out the Invention, wherein:

FIGS. 2A and 2B furnish partially exploded views of an azimuth adjustment mechanism constructed in accordance with the present invention;

FIG. 2C illustrates the relationship between the rotational axis of the aximuth adjustment mechanism of FIGS. 2A–B and the head gap centerline on the system playback head;

FIG. 3 is a circuit diagram of the playback head and pre-amp stage of the present invention;

BEST MODE FOR CARRYING OUT THE INVENTION

Figure 1:
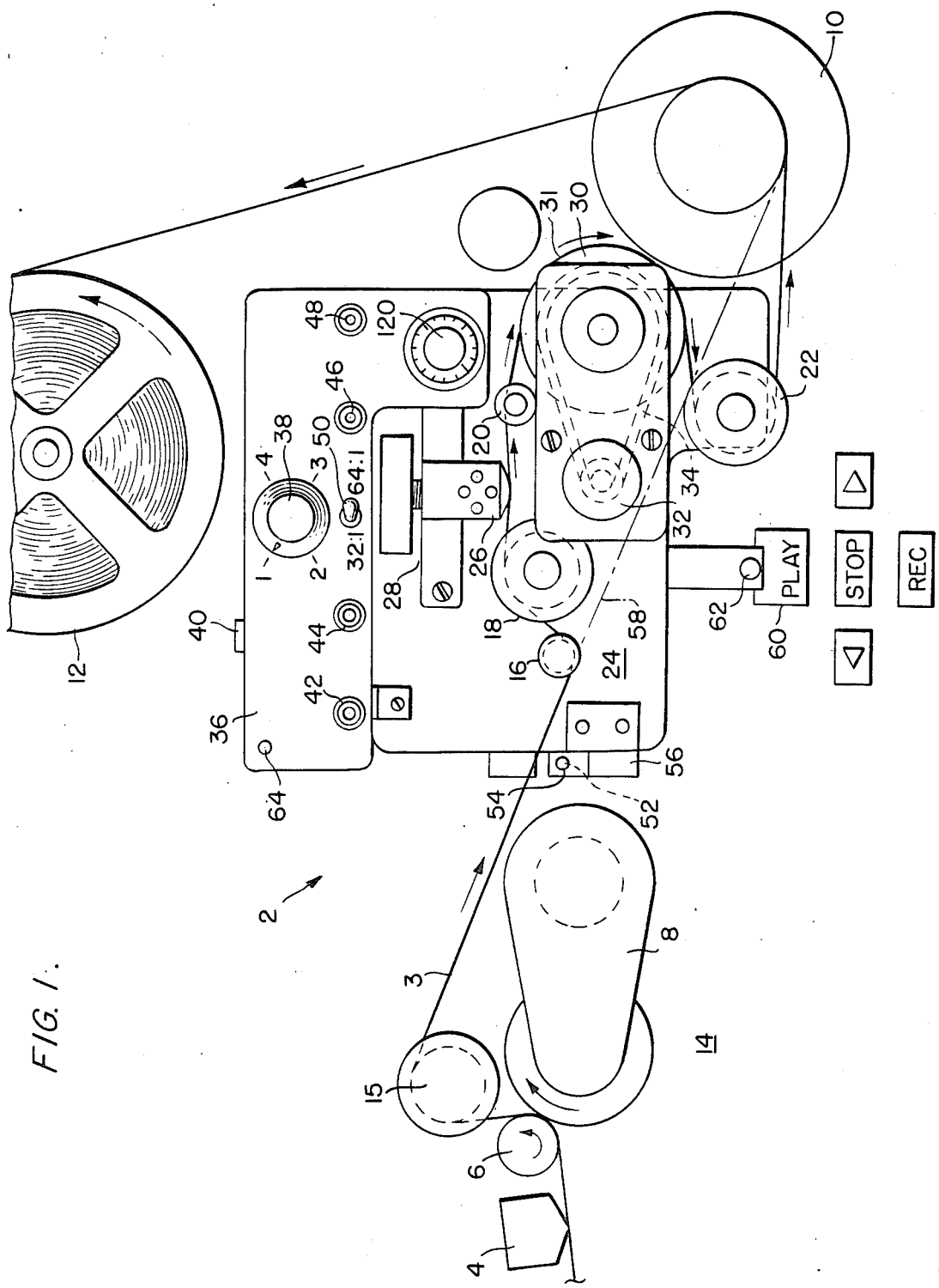
FIG. 1 is a top view of the performance monitoring playback system positioned on the deck of a conventional slave recorder.

The playback system of the present invention, indicated generally at 2 in FIG. 1, is designed to monitor the quality of signals recorded on a four-track cassette tape 3 by a duplicating recorder such as a Gauss 1200 high speed slave recorder. The slave recording head 4, exit capstan 6, exit pinch roller 8, inertial guide roller 10 and take-up reel 12 as conventionally arranged on the Gauss 1200 recorder deck plate 14 can be seen in FIG. 1. An exit guide roller 15 has also been mounted on deck plate 14 to increase the stability of the tape transport past slave recording head 4. Playback system 2 includes a series of guide rollers 16, 18, 20 and 22 mounted on a base plate 24. A four-track playback head 26 such as a Saki P93204 tape head detects changes in the fluxivity of the magnetic signals recorded by the slave recorder on each track of four-track cassette tape 3. Four simultaneous playback signals, one for each tape track, are generated by playback head 26 as a function of the detected fluxivity changes. An azimuth adjustment mechanism 28 is used to support the playback head on base plate 24. Height, zenith and rough azimuth adjustments are obtained by adjusting playback head mounting screws (not shown in FIG. 1), as will be discussed in greater detail hereinbelow. Calibrated azimuth adjustment is obtained by manipulating the azimuth adjustment mechanism 28 as will also be described in greater detail hereinbelow, providing azimuth error measurements to within $\pm\frac{1}{2}°$. A urethane puck 30 having a circumferential surface 31 which frictionally engages tape 3 is driven by a DC motor 32 via belt 34 to supply active tape take-up tension, bringing the tape into contact with playback head 26.

Figures 4, 5:
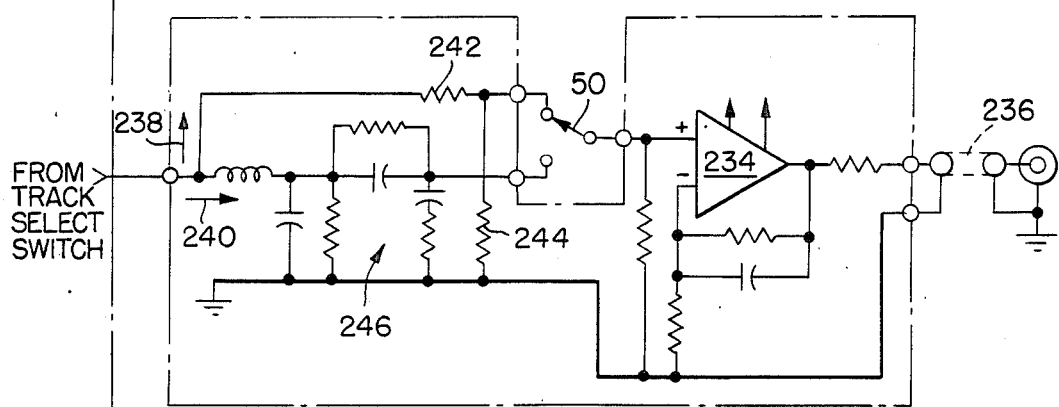
FIG. 4 is a circuit diagram of the final amplifier stage and switchable equalization network employed with the pre-amp stage of FIG. 3.
FIG. 5 is a diagram of the circuitry used to operate the DC drive motor in the active tape tensioning mechanism of the present invention.

A four-channel pre-amp stage for receiving and processing the playback signals generated by playback head 26 and circuitry for controlling the operation of DC motor 32 are contained in an electronic module 36 secured to base plate 24. The pre-amp stage, discussed in connection with FIGS. 3 and 4, provides equalization for each of the four playback signals. A selection switch 38 directs a selected one of the four equalized playback signals through a booster amplifier (not shown in FIG. 1) to an output jack 40, where the selected signal can be removed from the system and monitored. Alternately, the equalized playback signals can be tapped using a series of four jacks 42, 44, 46, and 48 to furnish simultaneous playback monitoring capability. A switch 50 connected to an adjustable filtering network in electronic module 36 is provided to permit processing of playback signals at either 64:1 or 32:1 tape duplication rates.

The entire playback system 2 is dimensioned to fit within the space between the exit pinch roller 8, the inertial guide roller 10 and the take-up reel 12 of the slave recorder, allowing the system to be constructed as a completely portable unit which is simply placed on the deck plate 14 of the slave recorder whenever performance monitoring is desired. In fact, the only modification which must be made to the slave recorder in order to prepare the slave recorder for receiving the system is the provision of a guide hole 52 on the deck plate 14. Guide hole 52 receives a locating pin 54 formed on a lip 56 of base plate 24 to properly position the system between the slave recorder exit pinch roller 8 and inertial guide roller 10.

Operation of the system is initiated by passing the four-track cassette tape 3 over slave recording head 4 and threading the tape through the slave recorder capstan 6 and exit pinch roller 8 to guide roller 15 in normal fashion. If the playback system 2 were not present on deck plate 14, the tape 3 would follow the path indicated in phantom at 58 until reaching inertial guide roller 10, from which point the tape travels to take-up reel 12. When the playback system is in use, tape 3 is instead threaded from slave recorder guide roller 15 around system guide rollers 16 and 18 across playback head 26 and guide roller 20. The tape continues around puck 30 and guide roller 22 before returning to inertial guide roller 10 and take-up reel 12. A conventional PLAY button 60 on the slave recorder is depressed to begin the slave recording operation, whereupon the tape begins to move through the slave recorder and the PLAY button lights up. An optical sensor 62 connected to electronic module 36 detects the lighting of the PLAY button and activates DC motor 32 to drive puck 30, pulling the moving tape past playback head 26. DC motor 32 is supplied with a voltage high enough to turn the motor at a speed which otherwise causes surface 31 to run faster than the tape. The wrap-around tape path defined by system guide rollers 16–22 and puck 30, in conjunction with the existing slave recorder take-up tension, is nevertheless sufficient to prevent slippage of the tape against the puck surface. As a net result, the puck speed will slow to that of the tape and the speed of DC motor 32 will be limited, permitting the motor operating current to rise until clamped by a current regulator circuit (not shown in FIG. 1) in electronic module 36. Motor 32 will thereafter operate in a torque mode to maintain a relatively constant amount of tension on tape 3. In this manner, adequate tape-to-playback head contact pressure is established and response of the system to high frequency playback signals is enhanced. The combination of the active tensioning provided by puck 30 and the circuitous tape path defined by guide rollers 16–22 also renders the playback system immune to influence from the slave recorder take-up tension. An LED display light 64 on electronic module 36 is connected to the current regulator circuit to furnish an indication of proper motor operation. Should tape 3 begin to slip relative to puck 30, a situation which might occur, for example, if dust or oil has accumulated on puck surface 31, the LED display light 64 will turn off to provide a visual warning for the system operator. The puck surface can then be cleaned with alcohol or the like and adequate tension will be restored to the tape when operation of the system is resumed.

The azimuth adjustment mechanism 28 is shown in FIGS. 2A and 2B. Azimuth adjustment mechanism 28 includes an adjustment bar 66 with a pivot block 68 attached to the center thereof, a cylindrical pivot pin 70 extends in a horizontal direction from the rear face of pivot block 68. Pivot pin 70 is seated in a pair of ball bearings 72, 74, which roller bearings are secured within a bore 76 disposed in a bearing support structure 78 on base plate 24. Adjustment bar 66 and pivot block 68 accordingly pivot relative to bearing support structure 78 about a pivot axis 1—1 coincident with the centerline of pivot pin 70. If desired, the end of pivot pin 70 furthest from pivot block 68 can be threaded to receive a screw 80 which locks the pivot pin in ball bearings 72, 74. A pair of spacers 82 and a spring 84 may be inserted over pivot pin 70 intermediate ball bearing 72 and pivot block 68 to provide an adequate pre-load against which screw 80 can be tensioned.

An adjustment plate 86 extends from the top of pivot block 68 to support playback head 26. More particularly, as seen in FIG. 2A, adjustment plate 86 contains a pair of non-threaded bores 88, 90 through which a pair of screws 92, 94 are inserted. Screws 92 and 94 are respectively received by a pair of threaded bores 96, 98 formed in a mounting plate 100 attached to playback head 26. A pair of springs 102, 104 may be placed over the shank sections of screws 92 and 94 between mounting plate 100 and adjustment plate 86 to provide a tensive force against which screws 92 and 94 may be tightened. A second pair of screws 106, 108 may be inserted through threaded bores 110, 112 formed along the outboard edges of adjustment plate 86 and brought into contact with the upper surface of mounting plate 100. Upon reflection, it should be evident that simultaneous tightening or loosening of screws 92 and 94 will provide gross height adjustment for playback head 26 with respect to base plate 24 while alternate tightening or loosening of screws 106 and 108 will provide a gross azimuth adjustment for playback head 26 with respect to the direction of tape travel across the playback head.

Non-threaded bores 88, 90 in adjustment plate 86 and threaded bores 96, 98 in mounting plate 100 are positioned such that pivot axis 1—1 intersects the centerline of the head gaps in playback head 26, as can be seen to best advantage in FIG. 2C. The head gaps are schematically depicted at 114 and the head gap centerline is shown as line x—x. The rotational axis 1—1 is illustrated as a point 116 on the head gap centerline x—x, it being understood that rotational axis 1—1 extends in a direction perpendicular to the plane of FIG. 2C. Arrow 118 indicates the direction of tape travel cross head gaps 114. The angle between the head gap centerline x—x and the direction of tape travel, i.e., the azimuth angle of playback head 26, is represented by $\alpha$. Thus, rotation of adjustment bar 66, pivot block 68 and playback head 26 about rotational axis 1—1 provides the adjustment necessary to achieve the desired 90° azimuth angle setting for the system.

Fine azimuth adjustment of playback head 26 is obtained by using an azimuth adjustment knob 120 linked to adjustment bar 66 via a stud 122. One end of stud 122 is threaded as indicated at 124. A corresponding bore 126 formed in one end of adjustment bar 66 is also threaded. The threaded end of stud 122 passes through the threaded bore 126 on adjustment bar 66 and is clamped via lock nut 128 to a ball cup 130 beneath the adjustment bar. Ball cup 130 furnishes a seat for a steel ball 132 which rests on base plate 24. A second threaded bore 136 at the end of adjustment bar 66 opposite the end containing threaded bore 126 receives the shank portion 138 of a screw 140. A spring 144 seated in a depression 146 formed in base plate 24 is placed around shank portion 138 of screw 140 and is thereby retained in position to pre-load adjustment bar 66. Hence, a torque is applied to adjustment bar 66 pivot pin 70, which torque tends to keep the ball cup 130 firmly seated on ball 132. Adjustments to the azimuth of playback head 26 are then made by rotating azimuth adjustment knob 120 in either a counter-clockwise or clockwise direction, whereupon the threaded end 124 of stud 122 interacts with the threaded bore 126 in adjustment bar 66 to pivot the adjustment bar about rotational axis 1—1 in clockwise or counter-clockwise fashion, as respectively indicated by arrows 148 and 150. If desired, a collar 152 secured to stud 122 with a set screw 154 can be employed to limit the rotation of azimuth adjustment knob 120 to approximately one full revolution.

The long lever configuration attained by the use of center-pivoted adjustment bar 66 and stud 122 permits extremely fine azimuth resolution for playback head 26. Typically, azimuth adjustments on the order of $\pm\frac{1}{2}°$ can be achieved. The presence of spring 146 beneath adjustment bar 66 insures that the pivoting of the adjustment bar caused by rotation of azimuth adjustment know 120 will always be symmetrical with respect to pivot pin 70. Because the pre-load applied to adjustment bar 66 by spring 144 prevents ball 132 from wandering on base plate 24, the stability of the adjustment bar pivoting action and the accuracy of the resulting azimuth adjustment is maintained.

The electronic module 36 of the device is illustrated in FIGS. 3, 4 and 5. Turning first to FIG. 3, the pre-amp stage of electric module 36 can be seen. The pre-amp stage comprises a series of four input circuits 156, 158, 160 and 162 which respectively process the playback signals generated at the head gaps 90 in playback head 26. Each input circuit and each head gap are associated with an individual one of the four tracks recorded on cassette tape 3. Inasmuch as input circuits 156–162 are essentially identical to one another in structure and function, only the circuit components of input circuit 156 are depicted in detail in FIG. 3. More particularly, input circuit 156 includes first, second and third stage operational amplifiers 164, 166 and 168 arranged to sequentially receive the playback signal output from the head gap aligned with track "one" on tape 3. This track "one" head gap, indicated schematically at 170 in FIG. 3, is connected to input circuit 156 through a pair of leads 172. The close proximity of input circuit 156 to the playback head 26 permits significant reduction in the length of leads 172, minimizing parasitic capacitance between the leads while increasing the immunity of the entire system to interference from AM radio signals. An RC circuit 174 connected to the positive input of first stage operational amplifier 164 is tuned to resonate with the head inductance at the high frequency end of the playback head response range, i.e., at frequencies having wavelengths approximating the physical dimensions of the head gap. Accordingly, the strength of the playback signal output from the head gap is "boosted" at high frequencies to provide an offset for high frequency gap losses. The output of first stage operational amplifier 164 is fed to a first low pass filter 176. Low pass filter 176, which is constructed from an inductor 178, a capacitor 180 and a resistor 182, is underdamped to furnish additional offset for high frequency gap losses. That is, the values of inductor 178, capacitor 180 and resistor 182 are selected to create a rise in the operational amplifier output just prior to the cutoff point at the top end of the low pass filter response range, again "boosting" the signal strength of high frequency playback signals input to first stage operational amplifier 164. The value of resistor 182 specifically sets the slope of the signal rise at cut-off.

If desired, crosstalk between pre-amp input circuits 156 and 158 can be eliminated by an appropriate feedback arrangement between the first stage operational amplifier 164 in input circuit 156 and the corresponding first stage operational amplifier, indicated schematically at 184, in input circuit 158. Crosstalk is a frequency-dependent phenomenon which occurs in response to magnetic coupling or overlap between physically proximate head gaps in playback head 26. Because the crosstalk components in each playback signal output from the head gaps are in phase, crosstalk in each input circuit can be cancelled through use of out-of-phase crosstalk feedback. To this end, the output of first stage operational amplifier 164 is supplied in feedback fashion through an RC network 186 to the negative input of first stage operational amplifier 184 and the output of first stage operational amplifier 184 is supplied through a similar RC network 188 in input circuit 158 to the negative input of first stage operational amplifier 164. RC network 186 includes resistors 190, 192, 194 and 196 together with capacitors 198 and 200. As previously mentioned, crosstalk is a frequency-dependent phenomenon and the values of capacitors 198 and 200 are adjusted to shift the shape of the feedback frequency response characteristic where necessary to provide crosstalk cancellation.

The first stage operational amplifiers (not shown) of input circuits 160 and 162 are also interconnected in feedback fasion through RC networks (not shown) to eliminate crosstalk between input circuits 160 and 162. This paired arrangement between input circuits follows from the fact that the cassette tape tracks associated with input circuits 156 and 158 provide the left and right stereo pair for one cassette tape program whereas the cassette tape tracks associated with input circuits 160 and 162 provide the left and right stereo pair for the second, separate cassette tape program. Crosstalk separation between input circuits 158 and 160 is provided by a magnetic shield in the form of a metal barrier 202 physically located between the track "two" and track "three" head gaps in playback head 26.

Playback equalization in the input circuits of the present invention is primarily performed by second stage operational amplifier 166. The positive input of second stage operational amplifier 166 receives the signal output from first low pass filter 176 and the output of second stage operational amplifier 166 is connected in feedback configuration through capacitors 204 and 206 to the negative input of the second stage operational amplifier. Capacitor 204 provides the dominant signal integration during the equalizing process, functioning in linear fashion across a wide range of signal frequencies. A resistor 208 having a relatively large value is tied across capacitor 204 to establish the break point at which compensation for standard cassette format low-frequency equalization is initiated, thereby attenuating playback signals at the low end of the playback signal frequency spectrum. Conversely, a resistor 210 having a relatively small value is tied across capacitor 206 to establish the break point at which compensation for standard cassette format high frequency equalization is initiated, thereby boosting playback signal strength at the high end of the playback signal frequency spectrum.

The output from the second stage operational amplifier 166, which essentially represents the fluxivity of the signal recorded on the first track of cassette tape 3, passes to the third stage operational amplifier 168 where the output is "fine tuned" by slightly altering the frequency response of the input circuit 156 following playback signal equalization. The basic gain of third stage operational amplifier 168 is set by a variable resistor 212 in the operational amplifier feedback loop. Variable resistor 212 functions across the full range of the playback signal frequency spectrum. Adequate trim for maintaining linear gain characteristics at low playback signal frequencies is provided by variable resistor 214 connected to variable resistor 212. A high frequency shunt capacitor 216 prevents high frequency playback signals from reaching variable resistor 214, permitting adjustments to the value of variable resistor 214 which shift the low frequency gain of third stage operational amplifier 168. Adequate trim for maintaining linear gain characteristics at high playback signal frequencies is provided by a unique filter network intermediate second stage operational amplifier 166 and third stage operational amplifier 168. More particularly, the output from second stage operational amplifier 166 is divided between two parallel signal paths and recombined at the negative input of third stage operational amplifier 168. The first signal path includes a low pass filter 218 comprising resistive elements $R_1$ and $R3_3$ and capacitive element $C_1$. The second signal path includes a high pass filter 220 comprising a variable resistor 222, resistive elements $R_5$ and $R_7$ and capacitive element $C_3$. The provision of high pass filter 220 in parallel with low pass filter 218 is significant, inasmuch as this parallel configuration permits high frequency trim to be performed above a fixed turnover frequency without shifting the low frequency response of input circuit 156. The latter action is possible because changes in the value of variable resistor 222 inversely affect the loading on the remaining high pass filter elements. That is, as the value of variable resistor 222 is increased, the loading of capacitor $C_3$ and resistor $R_5$ decreases whereas a decrease in the value of variable resistor 222 produces an increase in the loading of capacitor $C_3$ and resistor $R_5$. As a net result, the turnover frequency for high frequency playback signals remains unchanged as variable resistor 222 is adjusted to increase the high frequency gain of third stage operational amplifier 168. The turnover frequency established by low pass filter 218, on the other hand, also remains unaffected by changes in the value of the variable resistor 222 because the dominant signal influence when variable resistor 222 is adjusted to decrease high-frequency gain is exerted by low pass filter 218. Hence, the system operator can shift the value of variable resistor 222 to adjust the overall high-frequency gain of third stage operational amplifier 168 until a flat frequency response for input circuit 156 is achieved.

The actual response curves associated with the third stage operational amplifier of the present invention are approximately symmetrical. This symmetry is enhanced by establishing certain relationships between the values of the elements comprising low pass filter 218 and high pass filter 220. Specifically, in a preferred mode of the present invention:

$$C_1/C_3 = 2 \qquad (1)$$

If Equation (1) can be satisfied, the values of the resistive elements in the low and high pass filters can be set to obtain the proper balance between the low and high pass filter turnover frequencies, i.e.:

$$R_1 + R_3 = R_7 + R_v \qquad (2)$$

where $R_v$ represents the final value of variable resistor 222.

Further:

$$R_5 = R_1 + R_3 \quad (3)$$

and $$R_1 = R_3 \quad (4)$$

Rearranging Equations (2) and (3) yields:

$$R_5 = 2 R_1 \quad (5)$$

The output of third stage operational amplifier 168 is directed along with the outputs of the corresponding third stage operational amplifiers (not shown) in input circuits 158-162 to track selection switch 38. The position of track selection switch 38 may be adjusted to select the output from a desired one of the input circuits 156-162 for final amplification in a final amplification stage (not shown in FIG. 3) of electronic module 36. An output jack 226 may also tap the output from input circuit 156. Output jack 226, and similar output jacks 228, 230 and 232 associated with input circuits 158-162, permit the equalized playback signals from all four head gaps in playback head 26 to be received simultaneously by additional signal processing circuitry (not shown) for purposes of obtaining test information.

Turning next to FIG. 4, the final amplification of the playback signal is performed by an operational amplifier 234 which boosts the playback signal strength to a level sufficient for driving an electronic output cable 236. Output cable 236 supplies the playback signal to the test instrumentation (not shown) ultimately responsible for monitoring the playback signal. The positive input of operational amplifier 234 is connected to the output of track selection switch 38 through one of two current paths, indicated by arrows 238 and 240, in accordance with the setting of equalization switch 50. The first current path 238, which passes through a simple resistance dividing network consisting of resistors 242 and 244, is utilized when the system is providing playback signals from cassette tapes recorded at 64:1 duplication ratios. The second current path 240, which incorporates a low pass filter network 246, is utilized when the system is processing playback signals from cassette tapes recorded at a 32:1 duplication ratio. Low pass filter 246 restricts the upper limit of the frequency response of amplifier 234 to half that available at the 64:1 duplication ratio. Consequently, very high frequency components of the playback signal at the 32:1 duplication ratio are cut off to reduce spurious signal responses. The action of filter 246 also corrects for the shift in the break point frequencies of second stage operational amplifier 166 caused by the change in duplication ratios.

The circuit for controlling DC motor 32 is illustrated in FIG. 5. As discussed above, an optical sensor 62 connected to electronic module 36 detects the lighting of the PLAY button (not shown in FIG. 5) on the slave recorder, indicating that tape is being transported through the playback system. Activation of the optical sensor, which sensor comprises a light-dependent resistor, connects positive voltage supply lead 250 to the base of transistor 252, turning transistor 252 off to energize transistor 254. Transistor 254 then drives transistor 256 to supply operating current from positive voltage supply lead 250 across motor 32 to negative voltage supply lead 258, causing the motor to rotate puck 30 (not shown in FIG. 5) at a speed which matches that of the tape. Motor operating current increases until limited by transistor 260 connected between the base of transistor 256 and the negative voltage supply lead 258. The base of transistor 260 is tied to the emitter of transistor 256, permitting transistor 260 to sense the voltage drop across resistor 262 in the emitter circuit of transistor 256. When this voltage drop increases to a predetermined value indicative of the desired current flow through motor 32, transistor 260 turns on to shunt transistor 256 and clamp the current flow through the motor. Motor 32 thereafter operates in a constant current mode to provide the constant torque necessary for achieving constant tape tension. A final transistor 266 senses the voltage drop across transistor 256 to ensure that the motor continues to operate in constant current mode. As long as transistor 256 is conducting in its linear region, the voltage across transistor 256 remains at a steady value sufficient to activate transistor 266. Transistor 266 thus remains on, drawing current through LED 64 to furnish a visual indication of normal motor operation. If puck 30 begins to slip relative to the tape, however, motor 32 attempts to pull less current and transistor 256 approaches saturation as the voltage thereacross drops. Transistor 266 is consequently turned off to deactivate the LED 64, providing a visual warning of motor slippage. The system operator must then clean the surface of puck 30 to correct the tape slippage condition.

The present invention has been set forth in the form of one preferred embodiment. It is nevertheless understood that modifications to the playback system disclosed herein may be made by those skilled in the art without departing from the scope and spirit of the present invention. Moreover, such modifications are considered to be within the purview of the appended claims.

What is claimed is:

1. An apparatus for use in monitoring signals recorded on a recording tape by a tape recorder, the tape recorder operating during a recording mode to transport the recording tape past a recording device on the tape recorder while applying a preselected tension to the recording tape, said apparatus comprising:
   mounting means for positioning said apparatus relative to the tape recorder during the operation of the tape recorder in its recording mode;
   a head means disposed on said mounting structure for detecting signals recorded on the recording tape and for generating playback signals in response to the signals so detected, and;
   a drive means also supported by said mounting means in fixed relation to said head means for guiding the recording tape along a predetermined path through said apparatus while the tape recorder is operating in its recording mode and for pulling the recording tape past said head means with a tension which is independent of the preselected tension applied to the recording tape by the tape recorder.

2. An apparatus as set forth in claim 1, wherein said head means includes a head structure which contacts the recording tape guided along said predetermined path, said head structure having at least one head gap which detects magnetic signals recorded on the recording tape and outputs a playback signal in response thereto, said head means also including an amplifier means connected to said head structure for amplifying said playback signal.

3. An apparatus as defined in claim 2, wherein said amplifier means includes at least one filtering circuit and at least one equalizing circuit.

4. An apparatus as set forth in claim 3, wherein said filtering circuit is underdamped to compensate for losses in said playback signal when said playback signal has a wavelength approaching the dimensions of said head gap.

5. An apparatus as set forth in claim 3, wherein said equalizing circuit includes a first operational amplifier having resistive and capacitive elements connected in feedback configuration.

6. An apparatus as set forth in claim 5, wherein said equalizing circuit includes a second operational amplifier having first, second, and third variable resistor circuits connected thereto in feedback configuration, said second and third variable resistor circuits including shunt capacitors which respectively pass only high and low frequency signals.

7. An apparatus as set forth in claim 2, wherein said head structure is connected to said amplifier means through an RC circuit which resonates with the inherent inductance of said head gap.

8. An apparatus as set forth in claim 1, wherein said drive means includes a plurality of roller guides and a puck means which is driven to supply said tension to the recording tape in order to establish adequate contact pressure between the recording tape and said head means.

9. An apparatus as set forth in claim 8, wherein said puck means includes a warning means for providing a warning indicator when said puck means fails to supply said tension to the recording tape.

10. An apparatus as set forth in claim 8, wherein said puck means includes a puck structure driven by a motor at a speed otherwise faster than the speed at which the recording tape is driven by the tape recorder, said puck structure having a surface which contacts the recording tape in a manner designed to prevent relative slippage therebetween such that said motor is forced to operate in a torque mode to add a fixed amount of tension to the recording tape.

11. An apparatus as set forth in claim 10, further including a current supply means for supplying operating current to said motor, said current supply means having a clamp means for causing a constant current flow through said motor to force said motor to operate in said torque mode and provide a constant torque which adds said fixed amount of tension to the recording tape.

12. An apparatus as set forth in claim 11, wherein said current supply means includes a transistor means for causing said operating current to flow through said motor and said clamp means includes a shunt means for shunting said transistor means when the current flow through said motor reaches a predetermined value.

13. An apparatus as set forth in claim 12, further including a sensing means for sensing the voltage across said transistor means and for providing a warning when said voltage drops to indicate that relative slippage is occurring between said puck structure and the recording tape.

14. An apparatus as set forth in claim 10, wherein said puck means also includes a warning means for providing a warning indicator when said motor fails to operate to add said fixed amount of tension to the recording tape.

15. An apparatus as set forth in claim 1, wherein said mounting means is configured for releasable attachment to the tape recorder, rendering said apparatus portable.

16. An apparatus as set forth in claim 14, wherein the tape recorder includes a pinch roller structure spaced apart from a guide roller structure and said mounting means of said apparatus includes a locating means for positioning said apparatus between the pinch roller structure and guide roller structure of the tape recorder.

* * * * *

UNITED STATES PATENT AND TRADEMARK OFFICE
CERTIFICATE OF CORRECTION

PATENT NO. : 4,679,108
DATED : July 7, 1987
INVENTOR(S) : Keith E. Thomas

It is certified that error appears in the above-identified patent and that said Letters Patent are hereby corrected as shown below:

Claim 1, line 10 (col. 10, line 47), after "mounting" delete "structure" and insert --means--

Claim 16, line 1 (col. 12, line 32), after "claim" delete "14" and insert --15--

Signed and Sealed this

Seventh Day of February, 1989

Attest:

DONALD J. QUIGG

Attesting Officer

Commissioner of Patents and Trademarks